March 13, 1962  E. SCHLUETER  3,024,511
QUICK ACTING CLAMP
Filed May 26, 1959
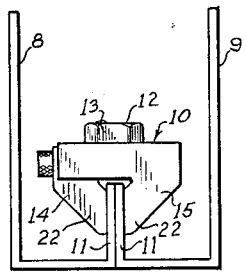
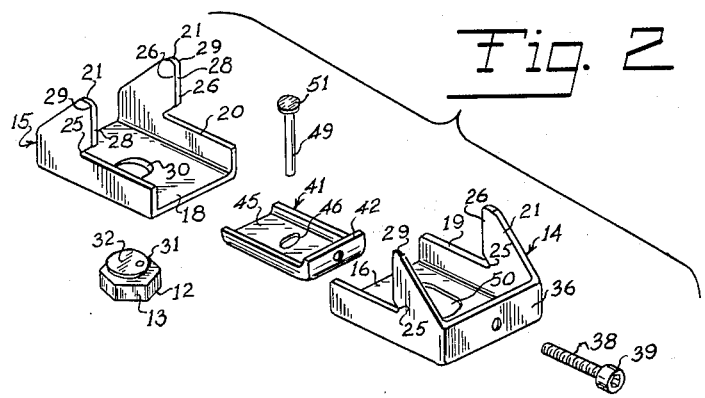
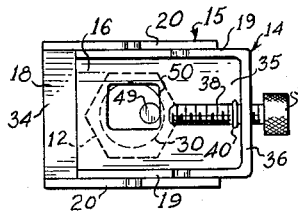
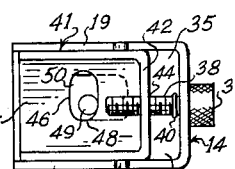
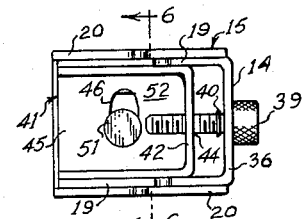
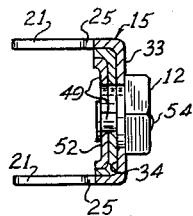
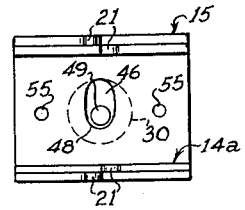
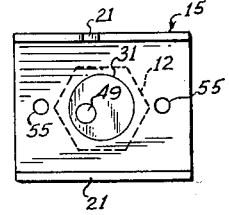
INVENTOR.
ERNEST SCHLUETER
BY
T. R. Jenkins
AGENT

United States Patent Office 3,024,511
Patented Mar. 13, 1962

3,024,511
QUICK ACTING CLAMP
Ernest Schlueter, 74 Edwards Road, Troy, N.Y.
Filed May 26, 1959, Ser. No. 815,850
5 Claims. (Cl. 24—263)

This invention relates to clamping devices and more particularly to quick opening and closing clamps and especially to such clamps for clamping two members together at a generally common plane and operable by turning a member about an axis in or parallel with the plane.

One object of the invention is to provide a clamp of this type having minimum dimensions and yet is strong and light in weight.

Another object is to provide such a clamp which can be operated in confined locations.

Still another object is to provide a quick acting clamp for the assembly of radar screening material.

And still another object is to provide a clamp for securing together pieces of flanged material.

These and other objects which will become apparent from a reading of the description are accomplished by a fastener which briefly stated includes inner and outer telescoped channel members respectively carrying opposed jaw members and an eccentric member mounted for turning and carried on the outer member to effect relative longitudinal movement of the channel members to open and closed position. The eccentric member produces motion of the channel members to a near dead center position where clamping force is at a maximum, and so for varying thickness of clamped material it is desirable to provide a cam member adjustable with respect to the inner channel member for engagement with a part of the eccentric member.

In the accompanying drawing showing, by way of example, two of many possible embodiments of the invention, FIG. 1 shows the fastener holding together two portions of material in a normally difficult location;

FIG. 2 is an exploded view of the fastener;

FIG. 3 is a bottom view of the inner and outer channel members in open position;

FIG. 4 is a bottom view of the inner channel member and cam member;

FIG. 5 is a bottom view of the complete fastener, in closed position;

FIG. 6 is a sectional view of fastener in closed position, the section being taken substantially along the line 6—6 of FIG. 5, looking in the direction of the arrows of said line;

FIG. 7 is a bottom view of another form of the invention in closed position, and FIG. 8 is a bottom view of the outer channel member and eccentric member.

The clamp 10 is shown in use to secure two flange members 11 in face-to-face contact. The flange members, as shown, are in "close quarters" and the clamp may be disposed about the flanges and closed to clamping position by using a long shanked T-shaped socket wrench (not shown) rather snugly receiving the operating hexagonal head 12 having tool engageable faces 13. The flanges 11 may be parts of many different types of structures of course, and the clamp has been found to be particularly suitable for clamping together radar screening material.

The clamp as shown in FIGS. 1 to 6 is adjustable for use with various thicknesses of flange material; that is to say that closure by the operating head is effected best when the clamp is adjusted for a given thickness of two flanges. While the size of the clamp may be varied according to the duty imposed upon it the clamp is particularly suitable to use in confined locations and in clamping radar screening. The clamp is all steel and weighs only about two ounces.

The clamp 10 comprises inner and outer slidably telescoped channel members 14 and 15, having respective webs 16 and 18 and pairs of side flange portions 19 and 20. About half-way the length of each of the four flange portions a triangular jaw prong such as at 21 extends from such portions and slightly toward an adjacent prong on the other channel member to provide two sets 22 of opposed clamping jaws. Each prong 21 is provided with a sloping back edge to give a shape imparting strength to the prong as a whole, but with an undercut notch 25 to allow the projecting portion 26 near the engagement edge 28 to yield slightly. The yield is not great as the stock of the channel members as shown is of about 1/16 inch steel stock and the engagement edge about ½ inch in length. The engagement edges 28 are sloped toward each other to provide about .010 inch greater width between the edges at their inner ends than at the outer. Furthermore each jaw prong is somewhat rounded as at 29 at the outer end of the engagement edges to permit ease of positioning the clamp over the flanges 11. This feature is of great help when positioning the clamp in a deep recess.

Reference is now made particularly to FIG. 3 showing substantially only the inner and outer channel members 14 and 15 in open position. The web 18 of the outer channel is provided with a circular hole 30 at about the center of the web and receives for rotation, or turning, therein a disk shaped stud 31, coaxial with and fast on the head 12, mentioned above, and extending over the outer face 33 of the web 18. The outer end 32 of the stud is flush with the inner face 34 of the web 18 so that the inner channel member may slidably move on the outer channel member (FIG. 6).

The outer end 35 of the inner channel member is provided with an inwardly directed end flange 36 through which an adusting screw 38 passes, parallel with the webs and between the side flanges 19, the screw being retained on the end flange by a knurled head 39 and retaining collar 40. The screw 38 effects closely controlled relative longitudinal movement between the inner channel member 14 and an innermost channel piece or cam member 41, nested in the two channel members 14 and 15, and provided with an end flange 42 through which the screw passes in threaded engagement as at 44. FIG. 4, showing substantially only the inner channel member 14 and the cam member 41, illustrates these two parts relative to each other to give nearly maximum opening of the clamp.

The web 45 of the cam member is provided with a cam slot 46 having one end a little to one side of the medial longitudinal line of the web and extending, transversely across the line and web, for a distance a little less than the radius of the disk stud 31. A camming pin 49 passes through the cam slot and a window 50 provided in the web 16 and then through the stud 31 and head 12, eccentric from the latter two. The pin is provided with a head 51, which bears against the outer face 52 of the web 45 at the marginal portions of the slot, and is swaged on the other end, as at 54, over the operating head 12 to hold the headed stud 31 and the members 14, 15 and 41 all together. The slot end at 48 is so located that the pin may be advanced to dead center, or only very slightly beyond, for locking position. Preferably the width of the slot is about equal to the diameter of the pin 49 so as to prevent wear inducing lost motion between the pin and cam member by repeated use.

It is contemplated that the clamp will be most often used for quick opening or closing operation by rotation of the head 12 and that use of the adjustment screw be made prior to clamping and unclamping. The slot 46 is therefore, preferably, not of exactly straight walls but slightly curved so that extreme locking position is approached more gradually upon turning of the disk than as a simple sine function of the angle turning.

When much work is to be done by fastening flanges of substantially uniform thickness it may be cheaper to provide non-adjustable clamps, that is to say, that, in effect the camming slot 46 rather than the window 50 be provided in the inner channel member and that camming member be omitted. Such is shown in the modification in FIG. 7. The outer member 15 remains with no change except the provision of registry holes 55. FIG. 8 is therefore applicable to either of the two forms of the invention. Thus the inner channel member 14a is provided with the cam slot 46. Registry holes are advisable in the non-adjustable form to indicate whether the jaws are nearly at the closeness for which the fastener was designed because there may be a temptation for the user to think that an appreciable resistance to turning of the head 12 is an infallible indication that the eccentric pin has been rotated to a safely sufficient degree to prevent loosening by vibration and the like.

In use of either forms of the invention as say in FIG. 1, the clamp may for example be lowered, open, to embrace the flanges 11 by first snugly fitting the hex-head 12 in a socket tool and positioning the clamp. The slight two ounces of weight of the clamp enables this to be done without difficulty provided the tool has a shank long enough, sometimes several feet to enable reaching the flanges 11 down between the side walls 8 and 9. With guides on the shank there is generally no difficulty in placing the clamp. A hard turn of the tool secures the clamp so that the tool may then be withdrawn. Tools less simple are required in cases where the walls 8 and 9 are not open at the top and the clamps are to be mounted spaced along the direction of the flanges 11. In any event the clamps themselves can be disposed between walls spaced at distances little more than the length of the fastener and no more than half a turn is necessary to open and close them.

The invention is also especially suited to the quick erection and take-down of portable frame works for protective coverings not only for use with simple flange material but particularly detented flanges subject to reparation rather than relative slippage.

The examples of use are only suggestive of the wide degree of application those skilled in the art will readily understand.

The invention claimed is:

1. A clamp comprising an outer channel piece having a web with a bearing hole therethrough and side flanges; a pair of jaws on the respective flanges; a pair of nested channel members having at least partially continuous web portions and nested within the piece, the members and piece each being longitudinally movable with respect to the others and one member being provided with a transverse slot in the web portion thereof and extending slightly across the medial line of the channel members; a pair of jaws fast on one of the members for cooperation with the first mentioned jaws; a rotary stud in the bearing hole provided in the web of the piece and provided with an eccentric pin fast on the stud and passing through the transverse slot in one of the members to longitudinally move same during rotation of the stud; and means for substantially fixing the position of one member longitudinally with respect to the other.

2. A clamp as claimed in claim 1, said members each having a flange at adjacent respective ends, and said means being an adjusting screw passing through the two end flanges.

3. A clamp as claimed in claim 1, said slot being in the inner of the nested channel members and the second mentioned pair of jaws being on the outer channel member.

4. A fastening clamp comprising inner and outer channel members slidable relative to each other, and having side flanges and a web, the members being provided with opposed jaw members extending from the flanges in a direction away from the web, the outer channel member having a circular hole in the web thereof and the inner channel member having a window through the web thereof, a short stud received in the hole and bearingly mounted for turning therein and provided with an operating member external of the web, a channel shaped cam member within the inner channel member and movable with respect thereto and provided with a transverse cam slot having one end extending slightly across the medial longitudinal line of the channel members; said inner channel member and cam member being provided respectively with adjacent end flanges; an adjusting screw passing through the end flanges for adjusting the distance between the end flanges, and a headed pin passing through said slot for cam action on the cam member and passing through the window provided in the inner channel member, and secured to the stud eccentrically thereof, so that turning of the operating member will cause the pin to gyrate and impart to the cam and inner channel members relative longitudinal movement with respect to the outer member.

5. A fastening clamp comprising inner and outer channel members slidable relative to each other and each having side flanges and a web, opposed pairs of jaw pieces carried on the members and extending from the flanges in a direction away from the planes of the webs, the outer channel member having a circular hole in the web thereof and the inner channel member being provided with a window through the web thereof; a short stud received in the hole and bearingly mounted for turning therein and provided with an operating member external of the web, a channel shaped cam member nested within the inner channel member and longitudinally movable with respect thereto and provided with a transverse cam slot having one end extending slightly across the medial longitudinal line of the channel members; said inner channel and cam members being provided respectively with adjacent end flanges; means for adjusting the distance between the end flanges, and a headed pin passing through the slot for cam action on the cam member and passing through the window provided in the inner channel member and secured to the stud eccentrically thereof, also to hold off said members together so that turning of the operating member will cause the pin to gyrate and impart to the cam member and inner channel member relative longitudinal movement with respect to the outer member.

References Cited in the file of this patent

UNITED STATES PATENTS

| | | |
|---|---|---|
| 692,865 | Lanterman | Feb. 11, 1902 |
| 919,558 | Doran | Apr. 27, 1909 |
| 1,682,604 | Disbrow | Aug. 28, 1928 |
| 1,778,700 | Whittier et al. | Oct. 14, 1930 |
| 2,319,377 | Wallace et al. | May 18, 1943 |
| 2,704,331 | Stott et al. | Mar. 15, 1955 |
| 2,880,490 | Rizzatti et al. | Apr. 7, 1959 |
| 2,911,700 | Wieland | Nov. 10, 1959 |